May 14, 1963
C. D. BRADLEY
3,089,519
LOAD CELLS FOR HYDRAULIC WEIGHING MACHINES
Filed Aug. 17, 1961
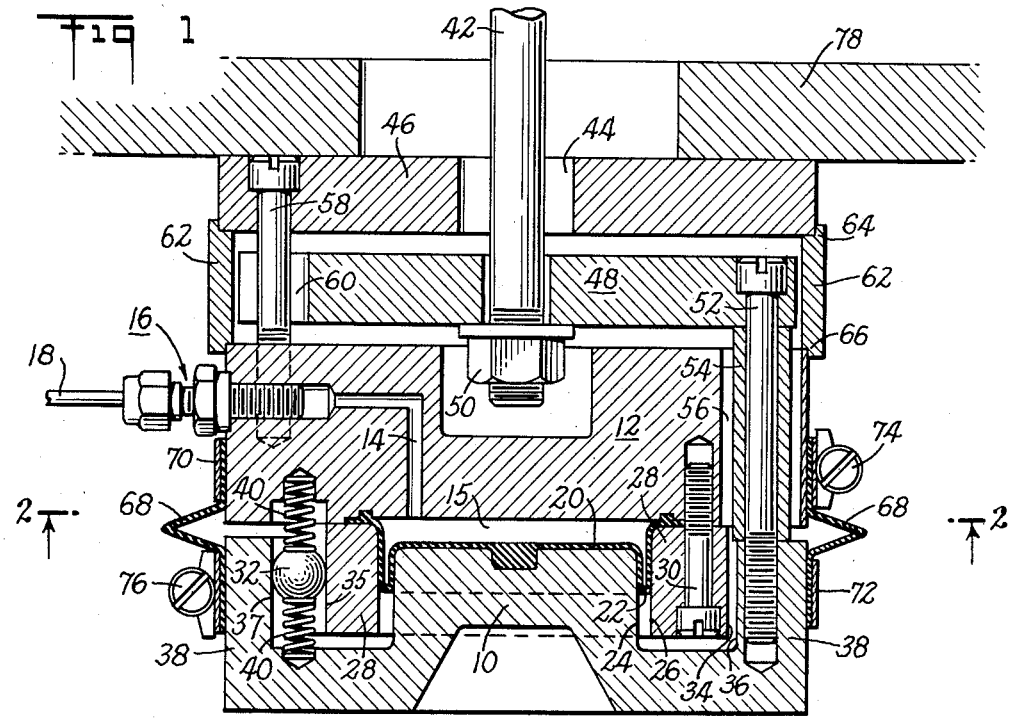
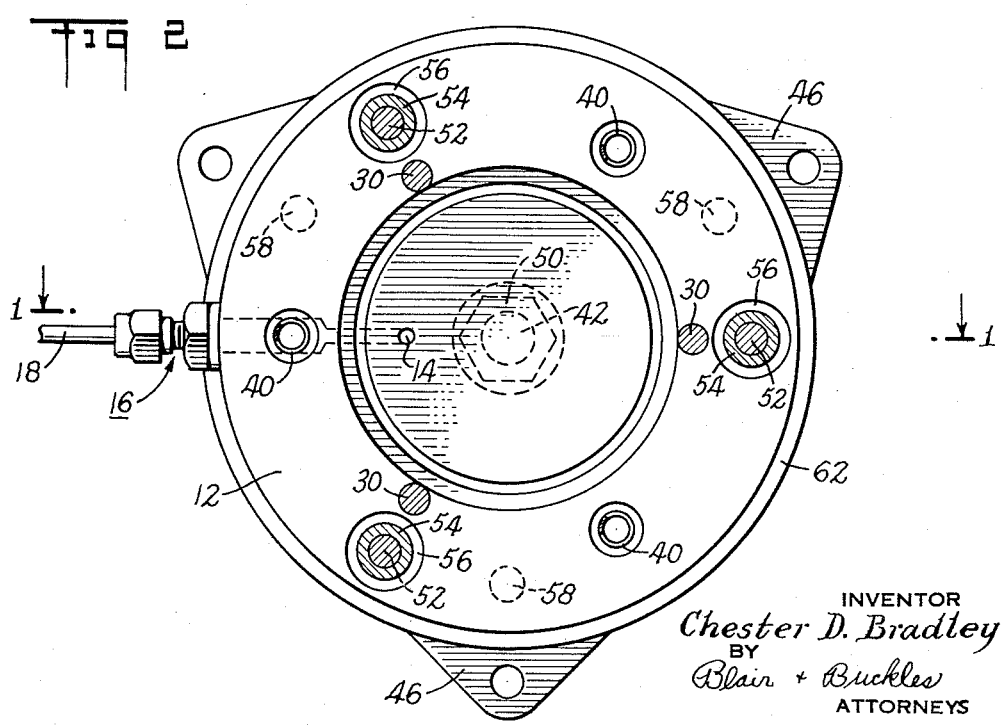
INVENTOR
Chester D. Bradley
BY
Blair + Buckles
ATTORNEYS

United States Patent Office 3,089,519
Patented May 14, 1963

3,089,519
LOAD CELLS FOR HYDRAULIC WEIGHING MACHINES
Chester D. Bradley, Darien, Conn., assignor to A. H. Emery Company, New Canaan, Conn.
Filed Aug. 17, 1961, Ser. No. 132,055
3 Claims. (Cl. 137—778)

This invention relates to improvements in fluid pressure load cells and more particularly to an improved hydraulic load cell for tension forces wherein the hydraulic line from the cell remains in a stationary position during operation and inaccuracies due to trapped air in the cell are minimized.

Hydraulic or fluid pressure load cells are well known in the weighing art and generally comprise a hydraulic piston and cylinder arrangement, for use with an indicating means for measuring the hydraulic pressure in the cylinder when a load is applied to the cell. Thus the load cell forms an integral part of fluid pressure weighing systems, which have generally been more satisfactory than beam scale type weighing apparatus, particularly in the weighing of heavy or bulky loads, in the measurement of tensile strength, jet engine thrust and like tension loads. One such load cell is disclosed in U.S. Patent No. 2,960,113, issued November 15, 1960, to C. D. Bradley and assigned to the assignee of the present application. The present invention is an improvement in that type of load cell particularly adapted for measuring vertical forces in tension, as encountered in continuous process weighing applications, and in tensile testing where it is necessary to apply a pulling force in an upward direction operation.

The load cell structure of the present application is specifically designed for mounting on the underside of a plane surface, as for example beneath a floor board, to receive and respond to upward tension forces applied to a tension bar extending vertically up through the mounting surface. For weighing material on a conveyor belt, or other continuously moving medium, the tension bar may be connected to one end of a rocker arm, or linkage, the other end of which passes beneath the conveyor to sense the force of the load, or tension of the belt. There are many applications in which it is necessary to measure upward pull, as in strip or ribbon tension control, dynamometer measurements, or cable tension measurements where a load cell must be located below and respond to an upward pull. The load cells of the prior art cannot be simply inverted for this type of operation, because entrapped air within the load cell pressure chamber causes inaccuracies in weight readings. Since air is readily compressible, the indicated weight under these circumstances will be considerably less than the actual load being weighed. Accordingly, all air must be purged from the hydraulic fluid chamber. The problem is particularly troublesome in load cells since the fluid displacement is relatively small and a small air bubble in the system will result in substantial inaccuracies.

A further disadvantage of most prior art load cells has been the constant flexing of the fluid pressure line as the cylinder or piston moves under the application of varying loads. This movement may cause abrasion of the hydraulic line, or loosening of the couplings and joints of the line, after a relatively short period of operation. Resulting leaks in the hydraulic line have heretofore required constant maintenance and inspection, and when undetected have resulted in inaccurate weighings. In the present invention I have eliminated all motion from the hydraulic fluid pressure line.

Accordingly, it is an object of the invention to provide an improved hydraulic load cell for measuring forces in tension.

Another object of the invention is to provide a hydraulic load cell of the above character which minimizes weighing inaccuracies due to air bubbles in the fluid pressure cell.

It is a further object of the invention to provide a load cell of the above character wherein the hydraulic fluid line remains stationary during operation of the cell.

A further object of the invention is to provide a load cell of the above character which is reliable and durable in operation.

Another object of the invention is to provide a load cell of the above character which is relatively inexpensive to manufacture and maintain.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

FIGURE 1 is an elevational view of the load cell of my invention in section, taken along lines 1—1 of FIGURE 2;

FIGURE 2 is a sectional bottom view of a load cell shown in FIGURE 1, taken along lines 2—2 thereof, with the boot assembly removed.

Referring now to FIGURES 1 and 2, the load cell of my invention will be seen to generally comprise a piston portion 10 reciprocable in a cylinder formed by ring 28 and cylinder block 12 which has a passage 14 leading from the pressure chamber 15 to the coupling 16 of the hydraulic line 18. A seal or diaphragm 20 overlays the top of the piston with a fold 22 between the piston side 24 and cylinder walls 26. To effect a fluid-tight seal around the piston, the diaphragm is secured around its periphery by the ring 28 held by bolts 30. To prevent pinching of the diaphragm fold 22, a plurality of steel balls 32 are positioned between the outer wall 34 of ring 28 and the inner wall 36 of an outer guide ring 38 which is preferably integral with the piston portion 10. Guide grooves 35, 37 in these walls retain the balls against circumferential movement. Springs 40 keep the balls 32 centered between the opposing grooves. For a better understanding of the structure and function of these balls, reference is made to the above U.S. Patent 2,960,113.

A rod 42 is provided which passes through opening 44 in mounting plate 46 for the coupling of tensile loads to the cell and is secured to a piston plate 48 by nut 50. Piston plate 48 is in turn secured to the guide ring 38 of the piston by three relatively long bolts 52 which pass through a spacer 54. The spacers 54 are positioned inside vertical openings 56 in the outer portion of the cylinder block 12.

The cylinder block 12 is secured to the mounting plate 46 by three bolts 58 which pass through cut-out portion 60 of plate 48. A spacing ring 62 is provided with cut-out shoulders 64, 66, to space the mounting plate from the cylinder block and also to seal the cell against the entrance of dirt, dust and the like. A flexible jacket or boot 68 is provided around the space between the cylinder block 12 and guide ring 38 of the piston block. The jacket is secured in place by a pair of clamping rings 70, 72, which are tightened around the jacket by screws 74 and 76, respectively.

In operation, mounting plate 46 may abut or be secured to a retaining plate 78 and the bar 42 may be secured to a load in any convenient manner such as by an eye or hook (not shown). A load pulling upwardly on bar 42 as seen in FIGURE 1 would then force the piston 10 upwardly into the cylinder 12 and displace hydraulic fluid from the pressure chamber 15, through the port 14, coupling 16 and hydraulic line 18 to an indicator means (not shown). Any air bubbles that may be trapped in the pressure chamber escape through port 14 and may be removed from the system through the indicator means. Thus, with the hydraulic fluid port positioned at the top of the pressure chamber, the probability of weighing inaccuracies due to air bubbles has been eliminated.

It will also be seen that the coupling 16 for hydraulic line 18 is secured to the cylinder block 12 which is fixed in position since it is secured firmly to the stationary mounting plate 46. Relative movement between the piston and cylinder is accomplished by moving the piston only; thus permitting the hydraulic line 18 and coupling 16 to remain in a fixed position during operation of the cell. By so doing, wear on the hydraulic line and couplings is greatly reduced, and leakage at this point of the cell has been minimized. This feature of the invention becomes increasingly important when the load cell is positioned in inaccessible or practically inaccessible areas where it is vital that the hydraulic line connection remain fluid-tight for extended periods of operation.

Thus, with my invention a tension load cell has been provided that is extremely accurate and reliable in operation and which requires a minimum of maintenance to maintain its accuracy and reliability. The above problems which are present in prior art load cells have been obviated by my invention and the novel features of construction have obviated these problems in an efficient and inexpensive manner.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

I claim:

1. A tension responsive fluid pressure load cell comprising in combination
   A. a stationary block having a recess forming a cylinder in its bottom surface,
      1. means forming a fluid passage extending within said block axially from the top of said cylinder and laterally to an external surface of said block and of said cell for direct connection with an external fluid pressure line,
   B. a piston interfitting in said cylinder and axially movable therein,
   C. a diaphragm secured to said block and overlying said piston to form a fluid pressure chamber between said cylinder and said piston,
   D. a load bearing member movable with respect to said stationary block along the axis of said cylinder, and
   E. connecting members connected between said load bearing member and said piston to transfer to said piston the axial motion a load being measured imparts to said load bearing member
      1. so that said piston moves to change the volume of said pressure chamber in response to the axial force applied to said load bearing member.

2. The load cell defined in claim 1 in which
   A. said stationary block is disposed intermediate said load bearing member and said piston,
   B. said connecting members freely pass by said stationary block to interconnect said load bearing member and said piston,
   C. a stationary support plate supports said block in a stationary manner which said load bearing member disposed between said block and said support plate
      1. means forming an aperture through said support plate to provide a passage through which said load bearing member can be coupled with the load being measured.

3. A tension responsive fluid pressure load cell for measuring a force directed upward with respect to a stationary platform, said load cell comprising in combination
   A. a stationary cylindrical block having a recess forming a cylinder in its bottom surface,
      1. means forming a fluid passage through said block communicating between the top of said cylinder and an external surface of said load cell
         a. so that a stationary external fluid pressure line can be rigidly connected in a stationary manner to said load cell at said passage for communicating with said cylinder,
   B. a piston interfitting in said cylinder and axially movably therein,
   C. a diaphragm secured to said block and overlying said piston to form a fluid pressure chamber between said cylinder and said piston,
      1. said pressure chamber communicating with said fluid passage,
   D. support means for disposition with respect to said platform to be restrained against upward motion with respect to said platform,
      1. means forming an aperture through said support means,
   E. a spacing member supporting said stationary block spaced below said support means
      1. with said cylinder being disposed substantially axially in-line with said aperture and
      2. constraining said stationary block from axial motion with respect to said support means,
   F. a load receiving member disposed between said support means and said block and receiving an upward load through said aperture in said support means, and
   G. tension members connected between said load receiving member and said piston to move said piston with respect to said block in response to the load applied to said load receiving member.

References Cited in the file of this patent

UNITED STATES PATENTS 3,004,558     Crane                Oct. 17, 1961